(12) United States Patent
Xiong et al.

(10) Patent No.: US 9,367,366 B2
(45) Date of Patent: Jun. 14, 2016

(54) SYSTEM AND METHODS FOR COLLABORATIVE QUERY PROCESSING FOR LARGE SCALE DATA PROCESSING WITH SOFTWARE DEFINED NETWORKING

(71) Applicant: NEC Laboratories America, Inc., Princeton, NJ (US)

(72) Inventors: Pengchong Xiong, Sunnyvale, CA (US); Vahit Hakan Hacigumus, San Jose, CA (US); Xin He, Princeton, NJ (US)

(73) Assignee: NEC Corporation (JP)

(*) Notice: Subject to any disclaimer, the term of this patent is extended or adjusted under 35 U.S.C. 154(b) by 50 days.

(21) Appl. No.: 14/504,434

(22) Filed: Oct. 2, 2014

(65) Prior Publication Data
US 2015/0277990 A1 Oct. 1, 2015

Related U.S. Application Data

(60) Provisional application No. 61/971,149, filed on Mar. 27, 2014.

(51) Int. Cl.
*G06F 9/45* (2006.01)
*G06F 9/52* (2006.01)

(52) U.S. Cl.
CPC *G06F 9/52* (2013.01); *G06F 8/433* (2013.01); *G06F 8/443* (2013.01); *G06F 8/445* (2013.01)

(58) Field of Classification Search
CPC ....... G06F 8/443; G06F 8/433; G06F 8/4441; G06F 8/445
See application file for complete search history.

(56) References Cited

U.S. PATENT DOCUMENTS

| | | | |
|---|---|---|---|
| 8,799,916 B2 * | 8/2014 | Cherkasova et al. | 718/104 |
| 9,201,638 B2 * | 12/2015 | Ravi | G06F 8/443 |
| 2011/0276789 A1 * | 11/2011 | Chambers | G06F 9/445 712/220 |
| 2012/0144376 A1 * | 6/2012 | Van Eijndhoven | G06F 8/456 717/146 |
| 2013/0097593 A1 * | 4/2013 | Ravi | G06F 8/443 717/158 |
| 2013/0191843 A1 * | 7/2013 | Sarkar et al. | 718/105 |
| 2014/0047422 A1 * | 2/2014 | Ravi | G06F 8/443 717/151 |
| 2014/0064066 A1 * | 3/2014 | Lumezanu et al. | 370/229 |
| 2014/0115560 A1 * | 4/2014 | Hutchison | G06F 8/451 717/113 |
| 2015/0200867 A1 * | 7/2015 | Dutta et al. | 370/229 |
| 2015/0347101 A1 * | 12/2015 | Boehm | G06F 8/41 717/140 |
| 2015/0365325 A1 * | 12/2015 | Hwang | H04L 47/70 370/230 |
| 2015/0378696 A1 * | 12/2015 | Boehm | G06F 8/443 717/149 |
| 2016/0065422 A1 * | 3/2016 | Khargharia | H04L 45/30 370/412 |
| 2016/0087845 A1 * | 3/2016 | Kaneriya | H04L 41/12 370/254 |
| 2016/0105364 A1 * | 4/2016 | Kanonakis | G06N 99/005 370/235 |

OTHER PUBLICATIONS

Park et al., "Locality-Aware Dynamic VM Reconfiguration on MapReduce Clouds", ACM, HPDC'12, Jun. 18-22, 2012, pp. 1-10; <http://dl.acm.org/citation.cfm?id=2287082&CFID=568448562&CFTOKEN=86401200>.*

(Continued)

*Primary Examiner* — Thuy Dao
*Assistant Examiner* — Ben C Wang
(74) *Attorney, Agent, or Firm* — Joseph Kolodka (57) ABSTRACT

A system includes a task scheduler that works collaboratively with a flow scheduler; a network-aware task scheduler based on software-defined network, the task scheduler scheduling tasks according to available network bandwidth.

18 Claims, 6 Drawing Sheets

(56) References Cited

OTHER PUBLICATIONS

Andreas Richard Voellmy, "Programmable and Scalable Software-Defined Networking Controllers", The Yale Haskell Group, pp. 1-142, Apr. 2013, <http://haskell.cs.yale.edu/wp-content/uploads/2013/04/thesis-singlespace.pdf>.*

Xiong et al., "A software-defined networking based approach for performance management of analytical queries on distributed data stores", ACM, Jun. 2014, pp. 955-966; <http://dl.acm.org/citation.cfm?id=2593681>.*

Sarwat et al., "Horton—Online Query Execution Engine for Large Distributed Graphs", 2012 IEEE, Apr. 2012, pp. 1289-1292; <http://ieeexplore.ieee.org/stamp/stamp.jsp?tp=&arnumber=6228190>.*

* cited by examiner

SYSTEM AND METHODS FOR COLLABORATIVE QUERY PROCESSING FOR LARGE SCALE DATA PROCESSING WITH SOFTWARE DEFINED NETWORKING

This application claims priority to Provisional Application 61/971,149 filed Mar. 27, 2014, the content of which is incorporated by reference.

Hadoop/Map Reduce is widely used as a software framework for easily writing applications which process vast amounts of data in-parallel on large clusters (thousands of nodes) of commodity hardware in a reliable, fault-tolerant manner. More specifically, a job in Hadoop is divided into tasks and then tasks are assigned to be processed at different nodes. When Hadoop assigns tasks, it assigns "local" tasks to a node first (that is, the data that is processed in the task resides on the local node), and when there are no local tasks, it will choose a "non-local" task (that is, the data that is processed in the task resides on a remote node) without considering the network bandwidth requirement of the task.

One problem of current Hadoop Map Reduce is that if the network path from one node to another node is congested, the execution time of an already assigned "non-local" task which depends on this network path can be very long and the whole execution time of the job is seriously influenced.

Conventional solutions have attempted to solve the problem by dynamic flow scheduling. The main idea is to schedule a flow to an "idle" path rather than a "congested" path when there are multiple paths available. There are two main issues regarding their solution. (1) Although their flow scheduler depends heavily on traffic demands of application (Hadoop Map Reduce), they only indirectly estimate flow demands. Bad estimation results in bad scheduling. (2) When all candidate paths of a network flow are congested, there is no solution for the flow scheduler.

SUMMARY

In one aspect, a method for efficient execution of analytic queries includes: collecting network flow information from switches within a cluster; receiving analytic queries with a programming model for processing and generating large data sets with a parallel, distributed process on the cluster with collaborative software-defined networking; and scheduling candidate tasks for a node when a node asks for tasks.

In another aspect, a system includes a task scheduler that works collaboratively with a flow scheduler; a network-aware task scheduler based on software-defined network, the task scheduler scheduling tasks according to available network bandwidth.

In one implementation, an application-aware flow scheduler works collaboratively with task scheduler. This flow scheduler receives flow schedule requests from the task scheduler, avoiding the imprecise estimation of traffic demands. The flow scheduler also dynamically updates the network information and reports to the task scheduler. Besides a flow scheduler based on software-defined network, we create a new Hadoop task scheduler to collaborate with the flow scheduler to reduce jobs' execution time.

Advantages of the system may include one or more of the following. The collaboration achieves better performance than using only one of them. Less complexity is required: Because task scheduler and network scheduler can communicate with each other, network scheduler is able to directly obtain traffic demands rather than indirectly estimate traffic demand. Faster operation is achieved: Our method can significantly reduce the execution time of Hadoop jobs when network path is possible to be congested. The system provides a more collaborative relationship between the Hadoop query processing and the network below where there is a more direct and continuous communication between those two components for improved query processing. It is intuitive that if Hadoop has more visibility to the state of the network, it can make better decisions on scheduling the tasks across the distributed nodes. The query processing and the network are separate entities that do not directly communicate with each and the emerging software-defined networking (SDN) direct APIs is used to monitor and control the state of the network. The SDN capability is used to create an efficient collaborative distributed query processing environment with Hadoop.

BRIEF DESCRIPTION OF THE DRAWINGS

FIG. 1A shows the current separate relationship while

DESCRIPTION

Figure 1A:
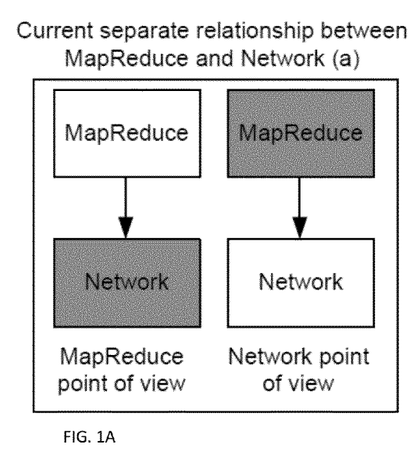
Figure 1B:
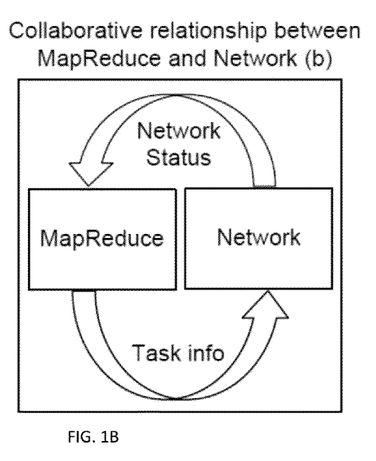
FIG. 1B shows a collaborative relationship between MapReduce and network.

The main cause of the problem is the current separation between MapReduce and networking as shown in FIG. 1A, i.e., MapReduce is agnostic to the underlying networking while networking neglects any MapReduce-specific customization requests. As a result, when the network is shared with other applications, it simply assumes all usages equal and tries to deliver its network service to all usages equally. In this context, we focus on the problem of how we can create a more collaborative relationship between MapReduce (Hadoop) and networking in order to improve the analytic query performance by exploiting the capabilities offered by software-defined networking (SDN). FIG. 1B shows a collaborative relationship between MapReduce and network.

For Hadoop (open source MapReduce) running on a traditional data center network as an example, as Hadoop stores data in a distributed file system (HDFS), it often involves remote data accesses, i.e., moving data from a data node to a computation node. Typically large Hadoop clusters are arranged in racks and the network traffic between different nodes within the same rack is much more efficient than the network traffic across the racks. Hadoop lets the cluster administrators decide which rack a node belongs to through the configuration. Based on each node's rack id, the locality optimization allows Hadoop to read data from local disks. In the optimal case, the task is data-local, that is, running on the same node that the data split resides on. Alternatively, the task may be rack-local: on the same rack, but not the same node, as the split. Some tasks are neither data-local nor rack-local and retrieve their data from a different rack from the one they are running on. The proportion of tasks that are neither data-local nor rack-local is not negligible. Moreover, although node's rack id helps provide the "data locality" information, a data split, which is assumed to be physically very close to a task-Tracker may actually be "far away" due to network congestion when network is shared with other applications.

Some data center applications often initiate connections between a diverse range of hosts and require significant aggregate bandwidth. Because of limited port densities in the highest-end commercial switches, data center topologies often exhibit a multi-rooted tree with higher-speed links but decreasing aggregate bandwidth moving up the hierarchy. These multi-rooted trees have many paths between all pairs of hosts. A key challenge is to simultaneously and dynamically forward flows along these paths to minimize or reduce link oversubscription and to deliver acceptable aggregate bandwidth. Unfortunately, existing network forwarding protocols are optimized to select a single path for each source/destination pair in the absence of failures. Such static single-path forwarding can significantly underutilize multi-rooted trees with any fanout. The state of the art forwarding in data center environments uses ECMP (Equal Cost Multipath) to statically stripe flows across available paths using flow hashing. This static mapping of flows to paths does not account for either current network utilization or flow size resulting in collisions overwhelming the switch buffers and degrading overall switch utilization. Hedera is a dynamic flow scheduling system for multi-rooted tree topologies. However, Hedera's flow scheduler works only after the flow runs. Moreover, it has to estimate the "real demand" to make the schedule decision simply because Hedera treats the application that generates the flow as a black box.

Figure 2:
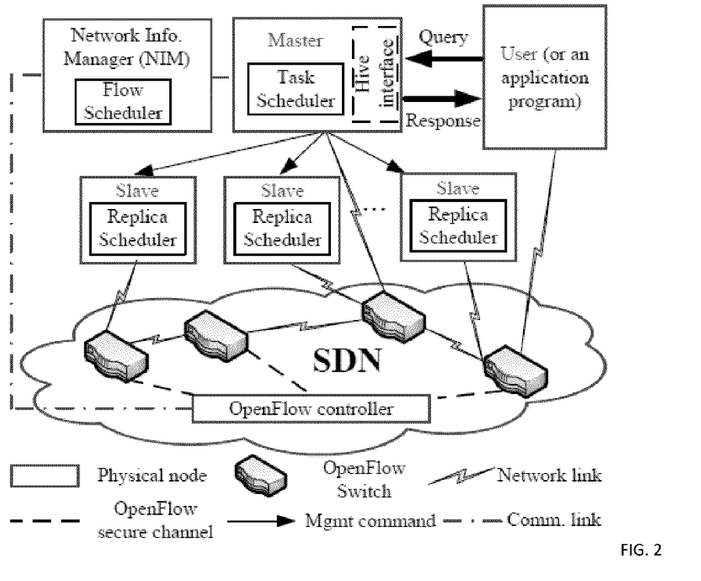
FIG. 2 shows exemplary system architecture.
Figure 3:
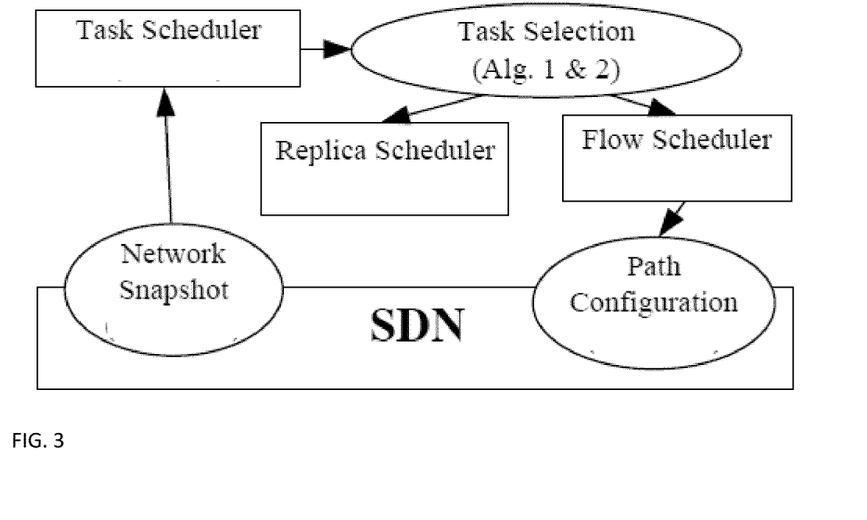
FIG. 3 shows exemplary collaborative relationship among schedulers.

FIG. 2 shows one examplary system architecture. The system is mainly comprised of Hadoop (with Master/NameNode and Slave/Datallode servers deployed in separate nodes), a network information manager, and an OpenFlow controller. We modify the task scheduler and the replica scheduler within Hadoop 1.2.1. We use Hive as the interface to accept SQL-like queries from a user or an application program. We build a network information manager, which contains a flow scheduler. The flow scheduler is connected with the OpenFlow controller.

The basic operation of the system is as follows: The OpenFlow controller collects all the flow information from all the OpenFlow switches and generates a snapshot of the current network status at a constant interval regularly. This information is stored at the Network Information Manager (NIM). When Hive receives a query, it translates the query into several map reduce jobs and submits the jobs to the Hadoop master. The snapshot of the network status at the query submission time serves as the basis for the collaboration between Hadoop and the network. The network status information is shared by the task scheduler, the replica scheduler, and also the flow scheduler. Based on this snapshot, the task scheduler at the master node assigns tasks to different slaves; the replica scheduler at each slave node selects replicas; and the flow scheduler schedules the flows. After all the jobs finish, the query results are returned to the user.

We use the standard Apache Hadoop distribution as the basis for the implementation of the system. We use HiveQL as the high level query language to express the database queries. A HiveQL query is translated into MapReduce jobs to run on Hadoop. For each MapReduce job, the Hadoop Distributed File System (HDFS) handles the reading/writing of the job's input/output data. A MapReduce job is generally composed of several map tasks (mappers) and reduce tasks (reducers). For each mapper, it reads a chunk of input data from HDFS, applies the map function to extract key, value pairs, then shuffles these data items to partitions that correspond to different reducers, and finally sorts the data items in each partition by the key. For each reducer, when it has collected all of the map output, it will perform a merge to produce all key, value pairs in sorted order of the key. As the merge proceeds, the reducer applies the reduce function to each group of values that share the same key, and writes the reduce output back to HDFS.

We use software-defined networking (SDN) to provide an approach to networking that decouples the control plane from the data plane. The control plane is responsible for making decisions about where traffic is sent and the data plane forwards traffic to the selected destination. This separation allows network administrators and application programs to manage network services through abstraction of lower level functionality by using software APIs. From the Hadoop point of view, the abstraction and the control APIs allow it to (1) monitor the current status and performance of the network, and (2) modify the network with directives, for example, setting the forwarding path for non-local tasks.

OpenFlow is a standard communication interface among the layers of an SDN architecture, which can be thought of an enabler for SDN. An OpenFlow controller communicates with an OpenFlow switch. An OpenFlow switch maintains a flow table, with each entry defining a flow as a certain set of packets by matching on 10 tuple packet information as shown below.

Flow::=[InPort,VLANID,MACSrc,MACDst,MAC-Type, IPSrc,IPDst,IPProto,PortSrc,PortDst]

Here InPort,VLANID,MACSrc,MACDst,

MACType,IPSrc,IPDst,IPProto,PortSrc,PortDst mean the incoming port of the flow, the vlan id of the flow, flow source's MAC address, flow destination's MAC address, flow source's IP address, flow destination's IP address, IP protocol of the flow, flow source's port number and flow destination's port number, respectively. When a new flow arrives, according to OpenFlow protocol, a "PacketIn" message is sent from the switch to the controller. The first packet of the flow is delivered to the controller. The controller looks into the 10 tuple packet information, determines the egress port (the exiting port) and sends "FlowMod" message to the switch to modify a switch flow table. When an existing flow times out, according to OpenFlow protocol, a "FlowRemoved" message is delivered from the switch to the controller to indicate that a flow has been removed.

A Network Information Manager (NIM) is provided. The NIM updates and inquires about the information on the current network state by communicating with the OpenFlow controller. The network information includes the network topology (hosts, switches, ports), queues, inks, and their capabilities. The runtime uses the information to translate the logical actions to a physical configuration. The NIM also hosts the switch information such as its ports' speeds, configurations, and statistics. It is important to keep this information up-to-date as inconsistency could lead to under-utilization of network resources as well as bad query performance. We consider two kinds of network devices, a NIC, which is associated with a physical node, and a switch, which connects NICs and switches. We define a hop as one portion of a path between a source and a destination. Data packets pass through switches on the way. Each time a packet is passed to the next device, a hop occurs.

At the end of an interval, the NIM sends an update command to the OpenFlow controller. The OpenFlow controller uses the OpenFlow protocol and collects the traffic information for all the flows from all the OpenFlow switches. We use Flow.rate to denote the amount of bandwidth usage for a Flow. For every Flow, the NIM keeps information about the current path $p_{Flow}$ and all the candidate paths $P_{Flow}$ Note that, all the hops on the current path $p_{Flow}$ will have the same amount of bandwidth usage Flow.rate.

When a scheduler sends an inquiry to the NIM to inquire $A(p_{Flow})$, i.e., the available bandwidth for a Flow with a specific path p, the NIM runs Algorithm 3.2.1 to calculate $A(p_{FLOW})$. Basically, the algorithm tries to find out the hop along the whole path that has the minimum available bandwidth (bottleneck). A(h) denotes the available bandwidth for a hop on the path and it is calculated as follows. Generally, in order to calculate A(h) for a Flow, we are interested in the other flows that could compete with Flow. These flows should share one or more of the hops with $p_{Flow}$. We sum up all the amount of these flows and the remaining bandwidth is assumed to be the available bandwidth for the hop. Note that, A(h) calculated by the formula below is a very rough estimation of the available bandwidth for the hop as there are various factors that we do not take into consideration, e.g., interaction between different flows with different internet protocols UDP and TCP.

$$A(h) = Cap - \sum_{h \in H(p_{Flow'}) \wedge Flow' \in \{Flow \backslash Flow\}} Flow'.rate$$

---

Algorithm 1: Calculate the available bandwidth for Flow with path p, denoted as $A(p_{Flow})$

---

1    Input: a Flow with a specific path p;
2    Output: $A(p_{Flow})$;
3    Min = infinity;
4    for $h \in H_{pFlow}$ do
5        if Min > A(h) then
6            Min = A(h);
7    Return Min.

---

Next, a path configuration handler for flow scheduler is detailed. Besides inquiring $A(P_{Flow})$, i.e., the available bandwidth for Flow with a specific path $p_{Flow}$, the schedulers can also inquire a list of candidate paths. In this case, the NIM can select the best path that has the maximum $A(p_{Flow})$. Based on the best path information, the OpenFlow controller sends a "FlowMod" message to the switch to modify the switch flow table to add the best path.

The task scheduler is discussed next. There is a jobTracker running on the master and a taskTracker running on each slave in Hadoop. The default job scheduler services jobs in an FIFO manner. Within a job, the default scheduling principle for Hadoop is to first allocate the map tasks and then the reduce tasks. The tasks are classified into four different task sets, i.e., failed task set, non-running task set, speculative task set, and task set with no location information. When a taskTracker is asking for a task, Hadoop searches the task sets in a sequential way. For map tasks within a specific task set, e.g., a non-running map task set, different priorities (from high to low) are given to node-local, rack-local, and non-local tasks with respect to the location of a taskTracker. For reduce tasks, there is no definition of locality.

We place a task close to its data. We implement an improved task scheduler by modifying Hadoop's default task scheduler. The default task scheduler uses the coarse-granularity node-local, rack-local, and non-local tags. However, the improved tasks scheduler uses global network status information for all the tasks. It greedily selects a task with the most available bandwidth from the data node to the taskTracker. Note that we assume that more available bandwidth may make the task finish faster and this approach is only "local" optimal for this task but may not be "global" optimal for all the tasks.

We apply Algorithm 3.3.2 for failed task set, non-running task set, speculative task set, and no location information task set, sequentially. We can see that, the algorithm searches for all the tasks in a task set (line 4). And for each task, it obtains the set of the data nodes that have a copy of the data for this task (line 5). It then builds a path from the data node $N_d$ to the computation node $N_c$ where taskTracker resides (line 7). It compares the available bandwidth for all the paths for all the tasks. It picks the one that has the maximum available bandwidth (line 9). Finally, it compares the maximum available bandwidth with a threshold (a configurable system parameter). It will return the task if the maximum available bandwidth is more than the threshold and return no task if the maximum available bandwidth is less than the threshold (which means there is serious network congestion for all the incoming paths for $N_c$ and it may be better to postpone until the situation improves).

---

Algorithm 2: Select task from a task set

---

1    Input: task Tracker at node $N_c$ which is asking the master for a task to execute. task set Task;
2    Output: the task $t_{exec} \in$ Task to be executed;
3    Max = −infinity; $t_{exec}$ = null;
4    for t ∈ Task do
5        NodeSet Datanode=t.getSplitLocations( );
6        for $N_d \in$ Datanode do
7
8            Path P = new Path($N_d$, $N_c$);
9            if A(P) > Max then
                      Max = A(P); $t_{exec}$ = t;
10   if Max > Threshold then
11       Return $t_{exec}$;
12   else
13       Return null;

---

Parameter P denotes an "abstract" path from $N_d$ to $N_c$. It is called an "abstract" path because it is defined from a "MapReduce" point of view, which is different from a physical path that is defined from a "Network" point of view. We use a discrete random variable P to denote an abstract path and use p to denote a physical path. We use P={$p_1, p_2, \ldots p_n$} to denote the sample space of all the n candidate physical paths. If ECMP is applied when a candidate path is chosen, then the probability mass function is:

$$f_P(p) = \begin{cases} \frac{1}{n}, & p \in P \\ 0, & p \notin P \end{cases}$$

Because P is a random variable, the available bandwidth A(P) is also a random variable. We propose three different ways to estimate A(P), i.e., "average", "optimistic" and "pessimistic". For example, we can calculate the expected available bandwidth based on the probability mass function shown in the following formula. Compared with the average method, we can also use the maximum and the minimum of the available bandwidth of all the candidate paths as the estimate value for A(P). We use "optimistic" and "pessimistic" to denote the methods, respectively. For example, the task scheduler may be optimistic, and it can use the maximum of the available bandwidth of all the candidate paths.

$$A(P) = \begin{cases} E(A(P)) = \sum_{p \in P} \frac{1}{n} A(p), & \text{average} \\ \max(p), p \in P, & \text{optimistic} \\ \min(p), p \in P, & \text{pessimistic} \end{cases}$$

We use Table 2 to illustrate our improved task schedulers for map tasks. We show three candidate tasks, i.e., task A, B, and C in a task set for the taskTracker at node $N_c$, which is asking the master for a task to execute. All the tasks are required to read a remote data block. Although there should be more than one replicas in real case for reliability and availability, we assume that there is only one replica for this data block for illustration purpose. We assume that, there are two physical paths, Path 1 and 2 from the node $N_d$ which stores the data block to node $N_c$ for each task. For each path, their available bandwidth is shown in the table. For example, the available bandwidth for path 1 and 2 for task B is 100 Mbps and 800 Mbps, respectively. Thus, average available bandwidth for this task should be the mean of the two values, i.e., 450 Mbps. If the task scheduler is optimistic, it will assume that the available bandwidth for this task is 800 Mbps, which is the maximum value. If the task scheduler is pessimistic, it will assume that available bandwidth for this task is only 100 Mbps. which is the minimum value. Thus, after comparing all the values, different task schedulers may make different decisions, denoted by (✓).

TABLE 2

Comparison of different task schedulers

|  | Task A | Task B | Task C |
| --- | --- | --- | --- |
| Path 1 (Mbps) | 100 | 100 | 500 |
| Path 2 (Mbps) | 100 | 800 | 500 |
| Theoretical (Mbps) | 100 | 450 | 500 (✓) |
| Optimistic (Mbps) | 100 | 800 (✓) | 500 |
| Pessimistic (Mbps) | 100 | 100 | 500 (✓) |

When there is no more map tasks to be scheduled, reduce tasks are scheduled. In this case, because node $N_c$, where taskTracker resides, will receive the data from a number of other data nodes concurrently, the incoming bandwidth is most likely to become a bottleneck. In our task scheduler, it compares the incoming available bandwidth of a taskTracker with the threshold. If it is over the threshold, it will assign the reduce task to the taskTracker. It will not schedule the reduce task to the taskTracker if it is less than the threshold.

Next, the replica scheduler is discussed. Hadoop runs on HDFS, which has its own replica write/read strategies. For write, the replica placement strategy is that if the writer is on a data node, the first replica is placed on the local machine, otherwise it is placed on a random data node. The second replica is placed on a data node that is on a different rack. The third replica is placed on a data node, which is on the same rack as the first replica. This strategy improves data reliability and availability.

For read, the reader opens the file it is required to read by calling open( ) on the FileSystem object, which for HDFS is an instance of DistributedFileSystem. DistributedFileSystem calls the namenode, using RPC, to determine the locations of the blocks for the first few blocks in the file. For each block, the namenode returns the addresses of the datanodes that have a copy of that block. Furthermore, the datanodes are sorted according to their proximity to the client (according to the topology of the cluster's network). If the reader itself is a datanode (in the case of a MapReduce task, for instance), then it will read from the local datanode, if it hosts a copy of the block.

The task scheduler works at the master site while the replica scheduler works at each slave site. Thus, the task scheduler may choose a replica for the task, which is different from the replica that is chosen by the replica scheduler. For example, an optimistic task scheduler schedules a map task on $N_c$, which has two split locations, $N_{d_1}$ and $N_{d_2}$. The optimistic task scheduler assumes that $N_{d_1}$ will be read according to the network situation. However, the default replica scheduler may actually read from $N_{d_2}$.

In order to fix this discrepancy, we modified the source code of HDFS. We follow the same strategy as the default replica scheduler for write. But we select the replica that has the maximum available bandwidth to server for the task. This makes the replica scheduler works collaboratively with the task scheduler. The algorithm for improved replica scheduler follows exactly lines 5-11 in Algorithm 2. Thus, if the task scheduler is average, optimistic, or pessimistic, our collaborative replica scheduler acts in the same way.

The flow scheduler is detailed next. The default flow scheduler applies Equal Cost Multi Path forwarding (ECMP). A key limitation of ECMP is that two or more large, long-lived flows can collide on their hash and end up on the same output port, creating an avoidable bottleneck. We follow the flow scheduler design in Hedera, i.e., the scheduler aims to assign flows to nonconflicting paths. When a new flow arrives at one of the edge switches, according to OpenFlow protocol, a "PacketIn" message is sent from the switch to the controller. The first packet of the flow is delivered to the controller. The controller looks into the 10 tuple packet information and forwards the information to the flow scheduler. Based on the packet information, the flow scheduler can identify the source and the destination of the flow. The flow scheduler will compare the available bandwidth for all the candidate physical paths for this flow. It will then choose the best path that has the maximum available bandwidth (i.e., the most nonconflicting paths). The best path is decomposed with multiple hops. For each hop, the flow scheduler uses the path change handler to configure the path, i.e., asks the OpenFlow controller to send "FlowMod" message to the switch to modify a switch flow table. Note that, we again assume that more available bandwidth will make the flow run faster and this approach is only "local" optimal for this flow but may not be "global" optimal for all the flows.

The schedulers may not be able to deliver the best optimized performance if they work separately as opposed to working collaboratively. For example, even if we can observe the global network status and the task scheduler makes the "best" decision accordingly following Algorithm 2, this "best" decision is not guaranteed at run-time if the task scheduler does not work collaboratively with a flow scheduler. The reason is simply because it is up to the flow scheduler (in the networking domain) rather than the task scheduler (in the MapReduce domain) to make the run-time decision on the real path for a flow. Let us consider a more concrete example: In Table 2, path 2 for task B has an available bandwidth of 800 Mbps, which is very high compared with the available bandwidth of all the other paths for all the other tasks. However, the average available bandwidth for task B is only 450 Mbps because it is still possible that the flow scheduler (following ECMP) will schedule path 1 for task B.

Figure 7:
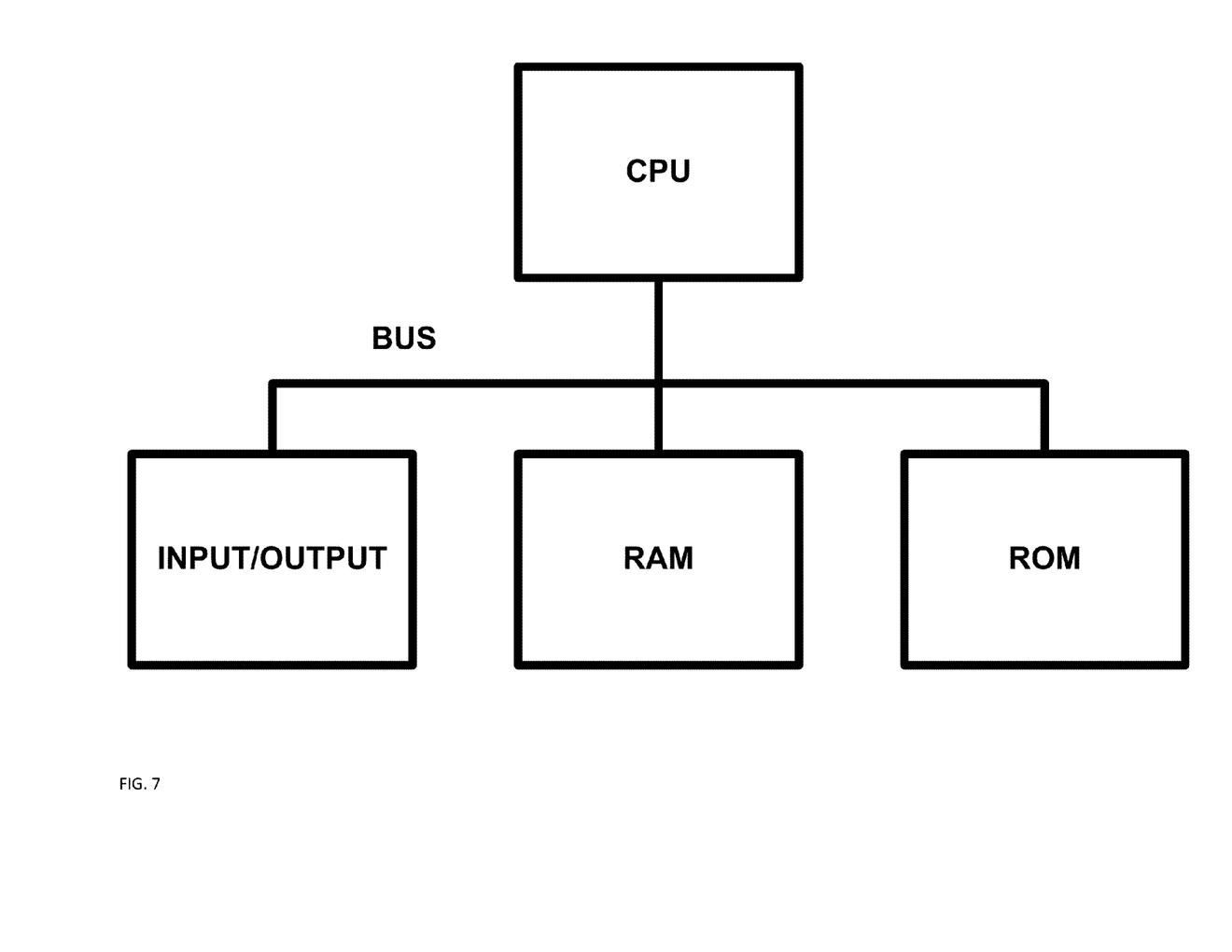

In order to improve this, we build the collaborative relationship among schedulers as shown in FIG. 7. (1) Network status snapshot is built by leveraging SDN. (2) The task scheduler (Optimistic) chooses the best task with a physical path p from $N_d$ to $N_c$ based on the network status and Algorithms 1 and 2. (3) The replica scheduler will choose the replica from $N_d$ accordingly. (4) The flow scheduler leverages the path configuration handler and schedules the physical path p accordingly. Compared with the previous case when the task scheduler is uncertain about the physical path, the task scheduler under a collaborative relationship is guaranteed the specific physical path by the flow scheduler. Therefore, a task scheduler, which is optimistic about the available bandwidth works well.

Figure 4:
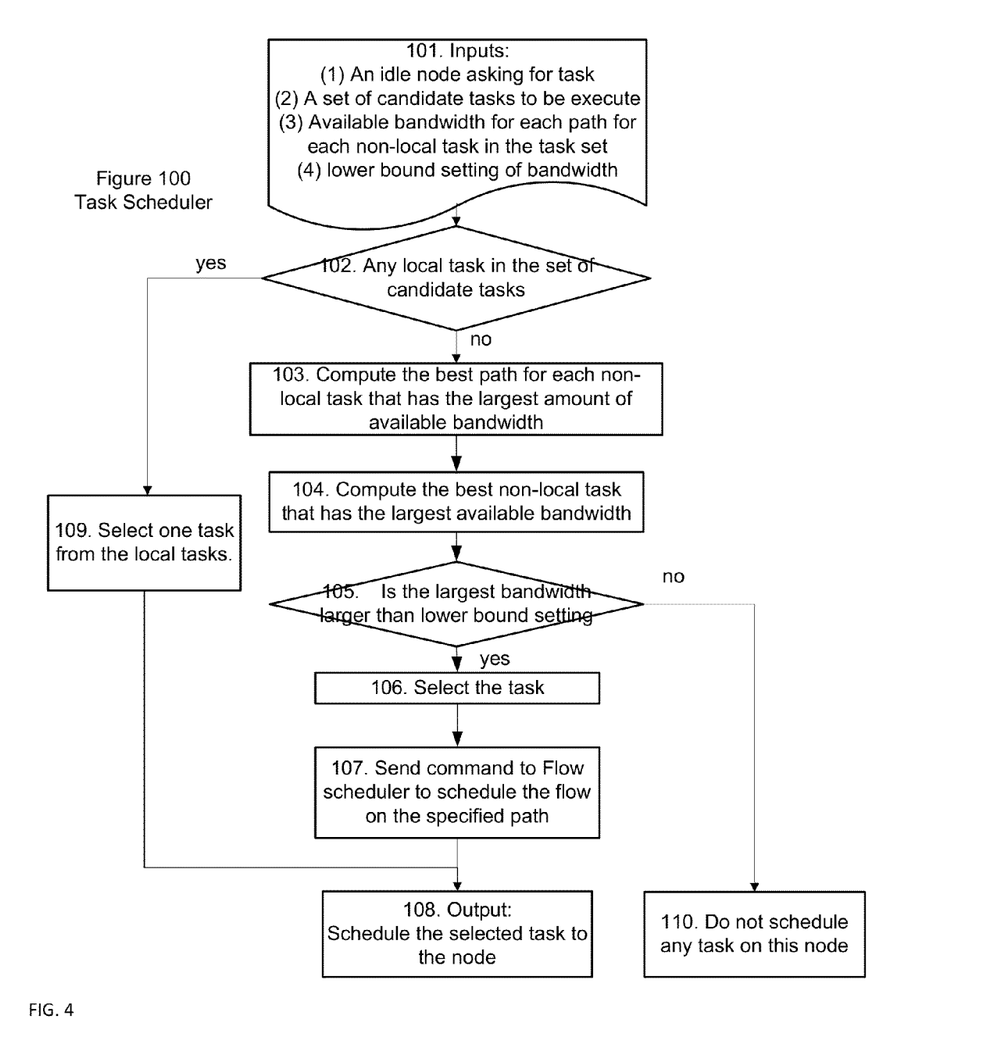
FIG. 4 shows an exemplary task scheduler process.

FIG. 4 shows an exemplary task scheduler process. The process receives inputs (101) and then checks for local tasks in the set of candidate tasks (102). If so, the process selects one task from the local tasks (109) and generates as output a schedule of the selected task to the node (108). Otherwise the process computes the best path for each non-local task that has the largest available bandwidth (103). The process then determines the best path for each non-local task with largest amount of available bandwidth (104). In 105, the process checks if the largest bandwidth is larger than a lower bound setting, and if not the process avoids scheduling tasks on the current node (110). Otherwise, the process selects the task (106) and sends command to the flow scheduler to schedule the flow on the specified path (107) and then continues to 108.

Figure 5:
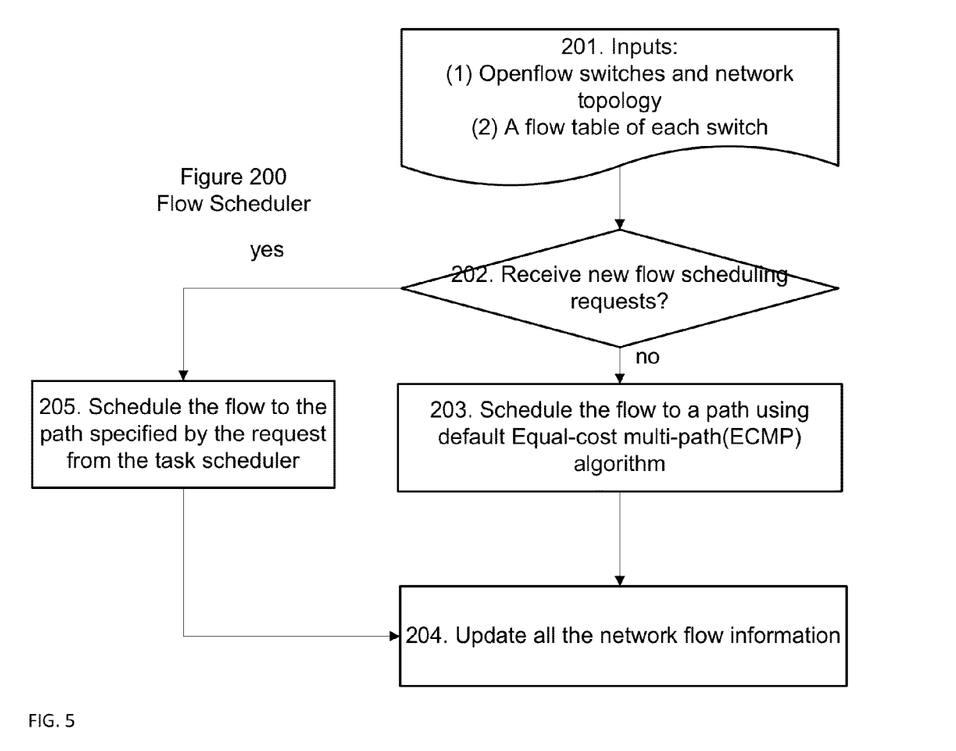
FIG. 5 shows an exemplary flow scheduler process.

FIG. 5 shows an exemplary flow scheduler process. The process receives as inputs openflow switches and network topology (201) and then checks for new flow scheduling requests (202). If not, the process schedules the flow to a path using default Equal-Cost Multi-Path (ECMP) method (203) and updates all network flow information (204). From 202, if new flow scheduling requests have been made, the process schedules flow to the path specified by the request from the task scheduler.

Figure 6:
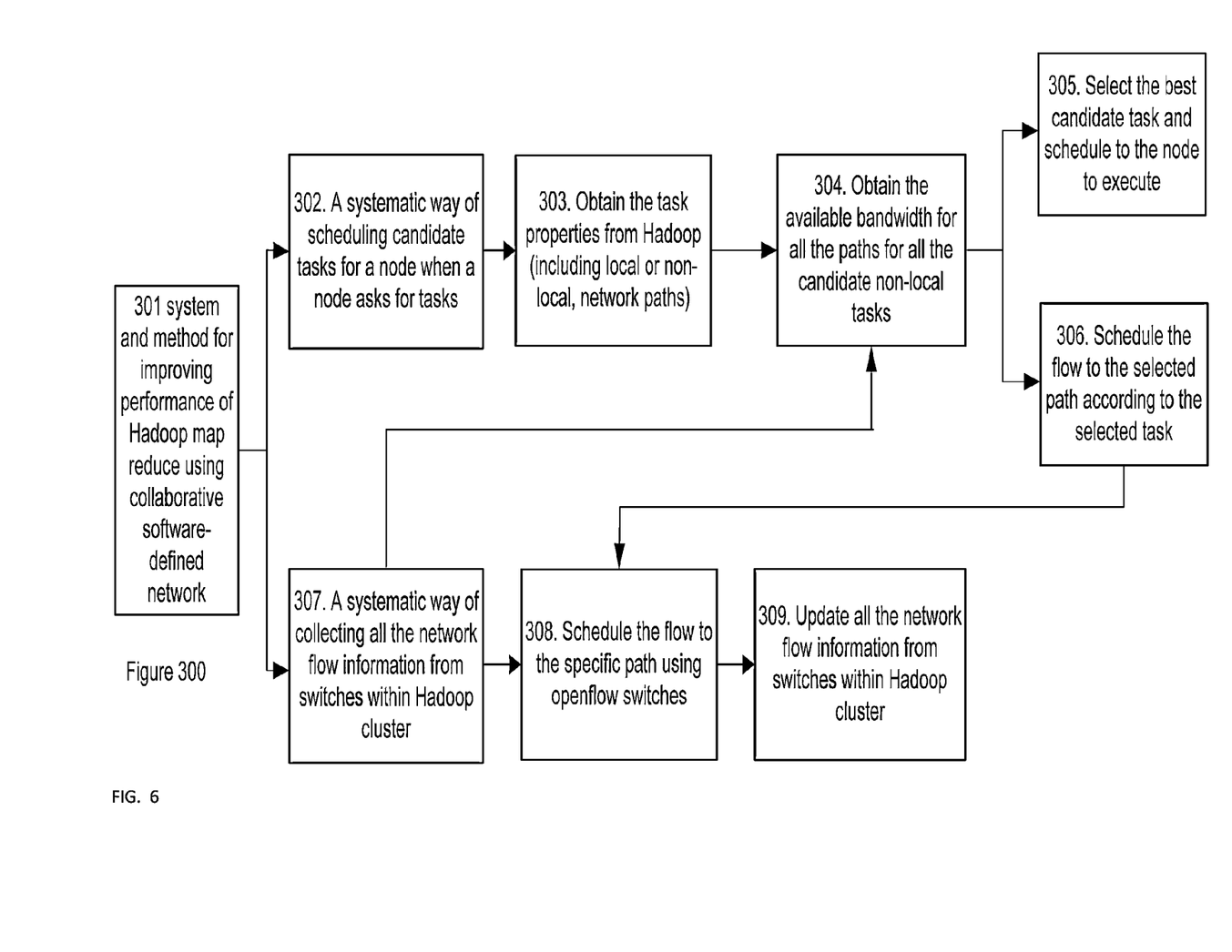
FIGS. 6 and 7 show an exemplary process and hardware for running analytic queries on MapReduce with collaborative software-defined networking.

FIG. 6 shows an exemplary process for running analytic queries on MapReduce with collaborative software-defined networking (301). The process includes a systematic way of scheduling candidate tasks for a node when a node asks for tasks (302). The process then obtains task properties including local/non-local, network paths (303). The process then obtains the available bandwidth for all candidate non-local paths (304). The process then either selects the best candidate task and schedule to a node to execute (305), or schedules the flow to the selected path according to the selected task (306) and then (308). The process also includes a systematic way of collecting network flow information from switches within Hadoop cluster (307), from which the process can either obtain the available bandwidth for all candidate non-local paths (304), or schedule the flow to a specific path using openflow switches (308). From 308, the process updates all network flow information from switches within the Hadoop cluster (309).

In particular, in 304, the task scheduler is obtaining the available bandwidth for all the paths for all the candidate non-local tasks from openflow switches. To the best of our knowledge, we have never seen any prior work leveraging such information. Previous task scheduler treats network as a blackbox and there is no way to obtain such information.

In 308, the flow scheduler receives a scheduling request for a flow to a specific path from the task scheduler and fulfills the request using openflow switches accordingly. To the best of our knowledge, we have never seen any prior work leveraging such information. On one hand, the task scheduler does not have access to control the flow without software-defined networking technology. On the other hand, the previous flow scheduler does not have traffic demands information and relies on estimation.

A Hadoop-based system with collaborative software-defined networking for efficient execution of analytic queries is detailed above. Compared with the conventional systems where Hadoop works separately from the network underneath, our system enables Hadoop to work together with the network to achieve better performance, i.e., shorter execution times for analytic queries. More specifically, the task scheduler in Hadoop makes scheduling decision for tasks based on the network status. The system uses a replica scheduler in HDFS and a flow scheduler for OpenFlow controller and the switches to follow. Through extensive experiments on an actually implemented system, we have demonstrated that our proposed system exhibits significant potentials for performance improvement for analytical queries. The system uses SDN to tightly integrate applications with the network to improve performance and utilization. A fine granularity monitoring system is contemplated. Rather than disk storage, we contemplate that main memory storage can achieve faster performance compared to Hadoop. Our methods can also improve the performance of distributed in-memory cluster computing.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device as shown in FIG. 7.

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method executed by a processor for efficient execution of analytic queries, comprising:

collecting network flow information from switches within a cluster;

receiving analytic queries with a programming model for processing and generating large data sets with a parallel, distributed process on the cluster with collaborative software-defined networking;

determining A(h) as available bandwidth for a hop on a path by determining from a capacity Cap competitive flows with Flow sharing one or more of the hops in a path $p_{Flow}$ as:

$$A(h) = Cap - \sum_{h \in H(p_{Flow'}) \land Flow' \in \{Flow \setminus Flow\}} Flow' \cdot rate; \text{ and}$$

wherein:
- A(h) denotes the Available bandwidth for the hop on the path;
- h denotes a member of all hops H;
- p denotes a specific path;
- Cap denotes a capacity;
- Flow denotes a flow;
- Flow' denotes a competitive Flow;
- $p_{Flow}$ denotes the current path; and scheduling, based on the available bandwidth A(h), candidate tasks for a node when a node asks for tasks.

2. The method of claim 1, wherein the programming model comprises MapReduce.

3. The method of claim 1, wherein the cluster comprises a Hadoop cluster.

4. The method of claim 1, comprising obtaining task properties including local or non-local network paths.

5. The method of claim 1, comprising obtaining available bandwidth for candidate non-local paths.

6. The method of claim 1, comprising selecting the best candidate task and scheduling the task to a node to execute.

7. The method of claim 1, comprising scheduling network flow to a selected path according to a selected task.

8. The method of claim 1, comprising collecting network flow information from switches within Hadoop cluster.

9. The method of claim 1, comprising scheduling network flow to a specific path using OpenFlow switches.

10. The method of claim 1, comprising updating network flow information from switches within the cluster.

11. The method of claim 1, comprising receiving a scheduling request for a flow to a specific path from the task scheduler and fulfilling the request using OpenFlow switches.

12. The method of claim 1, comprising Hadoop Map Reduce task scheduler works collaboratively with a flow scheduler.

13. The method of claim 1, comprising checking if the largest bandwidth is larger than a lower bound setting, and if not skipping scheduling tasks on the current node and otherwise selecting a task and sending command to a flow scheduler to schedule the flow for a specified path.

14. The method of claim 1, comprising network-aware task scheduler based on software-defined network, the task scheduler scheduling tasks according to available network bandwidth.

15. The method of claim 1, comprising communicating with an application-aware flow scheduler working collaboratively with a task scheduler.

16. The method of claim 1, comprising receiving flow schedule requests from a task scheduler for precise estimation of traffic demand.

17. The method of claim 1, comprising dynamically updating network information and reporting to a task scheduler.

18. A system including a memory for efficient execution of analytic queries, comprising:
- an application-aware flow scheduler stored in the memory;
- a Hadoop Map Reduce task scheduler stored in the memory working collaboratively with the flow scheduler, wherein the task scheduler is network-aware and based on a software-defined network, the task scheduler scheduling tasks according to available network bandwidth, wherein the flow scheduler receives flow schedule requests from the task scheduler and the flow scheduler dynamically updating the network information and reports to the task scheduler and determining A(h) as available bandwidth for a hop on a path by determining from a capacity Cap competitive flows with Flow sharing one or more of the hops in a path $p_{Flow}$ as:

$$A(h) = Cap - \sum_{h \in H(p_{Flow'}) \land Flow' \in \{Flow \setminus Flow\}} Flow' \cdot rate; \text{ and}$$

wherein:
- A(h) denotes the Available bandwidth for the hop on the path;
- h denotes a member of all hops H;
- p denotes a specific path;
- Cap denotes a capacity;
- Flow denotes a flow;
- Flow' denotes a competitive Flow;
- $p_{Flow}$ denotes the current path; and scheduling, based on the available bandwidth A(h), candidate tasks for a node when a node asks for tasks.

* * * * *